US006698020B1

(12) United States Patent
Zigmond et al.

(10) Patent No.: US 6,698,020 B1
(45) Date of Patent: Feb. 24, 2004

(54) TECHNIQUES FOR INTELLIGENT VIDEO AD INSERTION (75) Inventors: Daniel J. Zigmond, San Francisco, CA (US); Phillip Y. Goldman, Los Altos, CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/094,851

(22) Filed: Jun. 15, 1998

(51) Int. Cl.[7] .................. H04N 7/10; H04N 7/025; H04N 7/20; H04N 7/173; H04N 7/16; G06F 7/00; G06F 17/00
(52) U.S. Cl. ............. 725/34; 725/32; 725/68; 725/134; 725/139; 707/104.1
(58) Field of Search ............ 725/32–36, 39–43, 725/45–46, 49, 51, 68, 22, 14, 110–114, 120, 136, 139; 709/217–219; 707/103–104.1

(56) References Cited

U.S. PATENT DOCUMENTS

| | | | |
|---|---|---|---|
| 3,919,479 A | 11/1975 | Moon et al. ............... 179/1 SB |
| 4,677,466 A | 6/1987 | Lert, Jr. et al. ............... 358/84 |
| 4,788,682 A | 11/1988 | Vij et al. .................. 370/110.1 |
| 5,105,184 A | 4/1992 | Pirani et al. ................. 340/721 |
| 5,136,636 A | 8/1992 | Wegrzynowicz ............ 379/207 |
| 5,155,591 A | 10/1992 | Wachob ....................... 358/86 |
| 5,172,413 A | 12/1992 | Bradley et al. |
| 5,233,423 A | 8/1993 | Jernigan et al. |
| 5,382,970 A | 1/1995 | Kiefl |
| 5,410,326 A | 4/1995 | Goldstein |
| 5,412,416 A | 5/1995 | Nemirofsky |
| 5,446,919 A | 8/1995 | Wilkins ....................... 455/6.2 |
| 5,488,423 A | 1/1996 | Walkingshaw et al. |
| 5,524,195 A | 6/1996 | Clanton, III et al. |
| 5,532,735 A | 7/1996 | Blahut et al. |
| 5,559,549 A | 9/1996 | Hendricks et al. .............. 348/6 |
| 5,566,353 A | 10/1996 | Cho et al. ....................... 455/2 |
| 5,600,364 A | 2/1997 | Hendricks et al. .............. 348/1 |
| 5,600,366 A | 2/1997 | Schulman ....................... 348/9 |
| 5,636,346 A | 6/1997 | Saxe .......................... 395/201 |
| 5,659,653 A | 8/1997 | Diehl et al. .................... 386/46 |
| RE35,651 E | 11/1997 | Bradley et al. ................ 380/20 |
| 5,774,170 A | 6/1998 | Hite et al. ....................... 348/9 |
| 5,809,471 A * | 9/1998 | Brodsky ....................... 704/725 |
| 5,929,849 A * | 7/1999 | Kikinis ......................... 725/113 |
| 5,940,073 A * | 8/1999 | Klosterman et al. ......... 345/721 |
| 5,945,988 A * | 8/1999 | Williams et al. ............. 345/747 |

(List continued on next page.)

FOREIGN PATENT DOCUMENTS

WO  96/30864  10/1996

Primary Examiner—Andrew Faile
Assistant Examiner—Hai V. Tran
(74) Attorney, Agent, or Firm—Workman, Nydegger (57) ABSTRACT

A system and method for selecting and inserting advertisements into a video programming feed at the household level. An advertisement insertion device in a home entertainment system receives a plurality of advertisements from an advertisement source. The advertisement insertion device selects one of the advertisements for display to a viewer according to advertisement selection criteria combined with viewer and system information. The video programming is displayed to a viewer while the advertisement insertion device monitors the programming feed for a triggering event indicating an appropriate time to display the selected advertisement. At the appropriate time, the video programming feed is interrupted and the selected advertisement is displayed. Selecting advertisements at the household level allows advertisers to target viewers with a high degree of specificity. In particular, the advertisement selection criteria may take into account, for example, demographic data relating to the household, the geographical location of the household, of individual viewing habits. The method optionally includes monitoring and reporting viewer response to the selected advertisements.

23 Claims, 7 Drawing Sheets

U.S. PATENT DOCUMENTS

| | | | | |
|---|---|---|---|---|
| 6,002,394 A | * | 12/1999 | Schein et al. | 725/39 |
| 6,006,257 A | * | 12/1999 | Slezak | 725/110 |
| 6,029,045 A | * | 2/2000 | Picco et al. | 725/34 |
| 6,035,304 A | * | 3/2000 | Machida et al. | 707/104 |
| 6,058,430 A | * | 5/2000 | Kaplan | 709/245 |
| 6,061,719 A | * | 5/2000 | Bendinelli et al. | 709/218 |
| 6,064,980 A | * | 5/2000 | Jacobi et al. | 705/26 |
| 6,240,555 B1 | * | 5/2000 | Shoff et al. | 725/110 |
| 6,297,853 B1 | * | 10/2001 | Sharir et al. | 348/589 |

* cited by examiner

TECHNIQUES FOR INTELLIGENT VIDEO AD INSERTION

BACKGROUND OF THE INVENTION

1. The Field of the Invention

The present invention relates to displaying advertisements to viewers of video programming. In particular, the present invention is directed to methods and systems for selecting and inserting advertisements into a video programming feed at the household level.

2. The Prior State of the Art

A major source of revenue for commercial television broadcasters is the sale of broadcast time to advertisers. Advertising is the main source of income for national television broadcasters and their local over-the-air affiliates. Likewise, cable networks derive their income from a combination of the sale of advertising time and the receipt of cable subscription fees. Advertising revenue is a leading factor in the currently available diverse selection of commercial television programming.

Advertisers have typically attempted to maximize the return on their advertising investment by targeting specific viewer segments that are likely to be most receptive to the commercial message embodied in the advertisements. One of the most widespread and simplest ways of targeting viewers involves identifying what types of viewers are associated with specific television programs. For example, it may be found that sports programming is viewed by a segment of the population that includes a disproportionate number of persons who are likely to purchase automobiles. In another example, it may be found that news programs are viewed most frequently by persons who are more interested in investment services than the public at large.

Advertisers offering goods or services that coincide with the interests of the viewers of a particular program are usually willing to pay a premium for advertising time associated with the program. Accordingly, broadcasters have a financial incentive to provide programming that is easily associated with specific segments of the viewing population and to facilitate the identification of the profiles of viewers.

Another method of targeting specific viewing audiences involves selecting advertisements according to the geographical region in which they are to be broadcast. Frequently, viewers in one local or regional area may be more likely to be receptive to an advertiser's message than viewers in a different area. For example, some advertisements are presented by businesses operating in a limited geographical area. Accordingly, advertising success and the advertising revenues received by broadcasters are maximized when different advertisements may be broadcast to different geographical areas.

Figure 1:
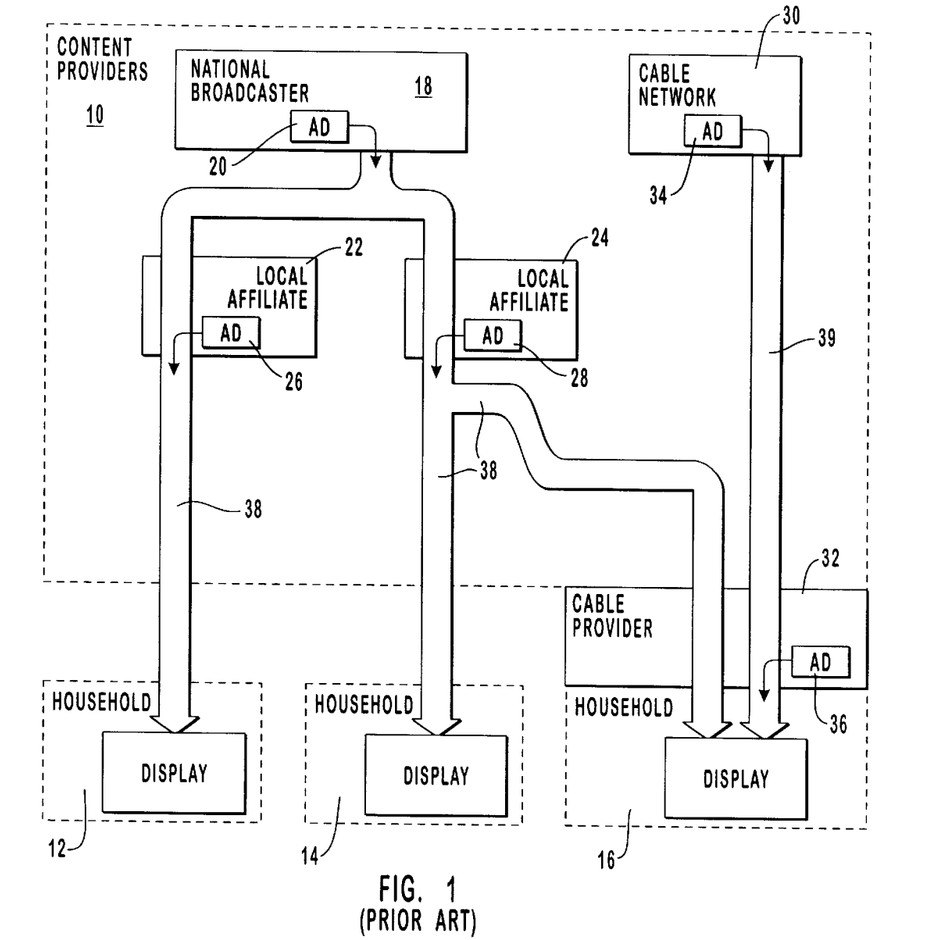
FIG. 1 is a schematic diagram of a broadcasting system of the prior art wherein advertisements are selected and broadcast to viewers of different geographical regions.

FIG. 1 illustrates a conventional example of a system for selectively broadcasting different advertisements to households in different geographical regions. A typical broadcasting system includes content providers 10 that distribute television programming to households 12, 14, and 16. In this example, content providers 10 include a national broadcaster 18, which is one of the national television broadcasting networks. Each national broadcaster 18 typically provides programming, including advertisements 20, to a plurality of local affiliates 22, 24, and others scattered across the country.

Local affiliates 22 and 24 contractually agree with national broadcaster 18 to provide the broadcasting equipment and services for distributing the programming of national broadcaster 18 to a local or regional area. In compensation for broadcasting the programming, national broadcaster 18 allows local affiliates 22 and 24 to sell and broadcast local advertisements 26 and 28. In this example, it is to be understood that local affiliate 22 serves a different geographical region than local affiliate 24. Accordingly, many of the advertisements 26 broadcast by local affiliate 22 are likely to be different than the advertisements 28 broadcast by local affiliate 24. Such geographical differentiation of advertisements is often of great interest to advertisers. Local advertisers may find it cost-effective to purchase advertising time from local affiliate 22 or 24 in order to specifically target local viewers, while it would be impractical to purchase an advertisement 20 for national distribution. In this conventional approach to selling advertisement time, the contractual arrangement between national broadcaster 18 and local affiliates 22 and 24 ordinarily attempt to strike a balance between local advertisements 26 and 28 and national advertisements 20 in order to maximize overall advertising income.

Another important segment of the television broadcast industry involves cable networks 30, which are generally not associated with local affiliates. Instead, cable networks 30 distribute their programming to cable providers 32 by means of satellite or other communication systems. Cable networks 30 sell advertising time to national advertisers generally in a similar manner as national broadcaster 18. Accordingly, the typical advertisement 34 broadcast by cable network 30 is targeted to the national viewing audience. As a financial incentive to encourage cable providers 32 to make the programming of cable network 30 available to cable subscribers (i.e., household 16), cable network 30 often designates selected time slots that may be sold to local advertisers by the cable provider. Thus, many cable providers insert local advertisements 36 into the programming of cable networks 30.

Frequently, the geographical area served by a cable provider 32 is significantly smaller than the geographical area served by a local affiliate 22 or 24. Accordingly, the advertisements 36 distributed by cable provider 32 may be targeted to relatively small geographically areas, such as a specific city.

The effects of the conventional distribution of advertising time between local and national advertisers may be more fully understood by considering the system of FIG. 1 from the standpoint of viewers in households 12, 14, and 16. In this example, it is assumed that household 12 is in a first geographical region served by local affiliate 22 while households 14 and 16 are in a second geographical region served by local affiliate 24. Furthermore, household 16 is in a specific city served by cable provider 32 within the second geographical region. In this example, a viewer in household 12 receives advertisements 20 from national broadcaster 18 and advertisements 26 from local affiliate 22. Household 14 receives the same advertisements 20 from national broadcaster 18 but receives advertisements 28 that are specifically targeted to the second geographical region served by local affiliate 24. Household 16 also receives advertisements 20 from national broadcaster 18 and advertisements 28 from local affiliate 24. In addition, household 16 receives national advertisements 34 from cable network 30 and local advertisements 36 from cable provider 32.

Figure 2A:
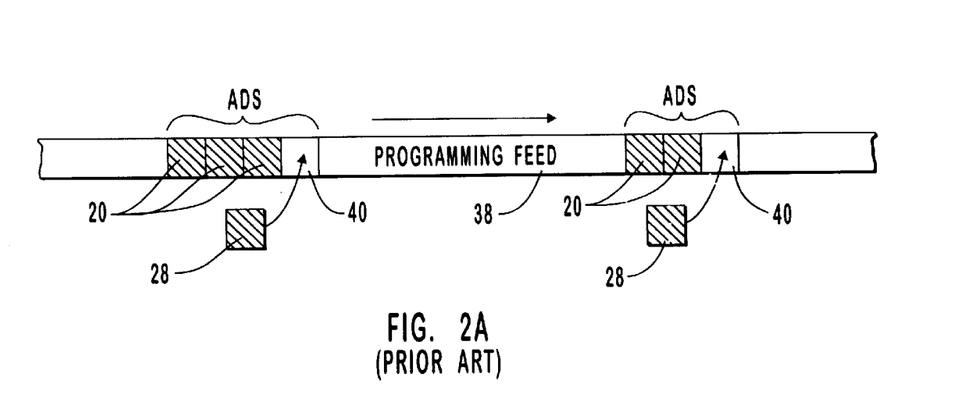
FIG. 2A is a schematic diagram of the insertion of advertisements into a video programming feed by a local affiliate of a national broadcaster as practiced in the prior art.

FIG. 2A illustrates a conventional system whereby a local affiliate inserts local advertisements into a video programming feed received from a national broadcaster. In FIG. 2A, a series of advertisements 20 are included at a predetermined time in programming feed 38 by the national broadcaster 18 of FIG. 1. According to the contractual agreement between the national broadcaster 18 and local affiliate 24, the national broadcaster includes in the programming feed 38 an occasional time slot 40 that is filled by local advertisements 28 sold to advertisers by the local affiliate.

Figure 2B:
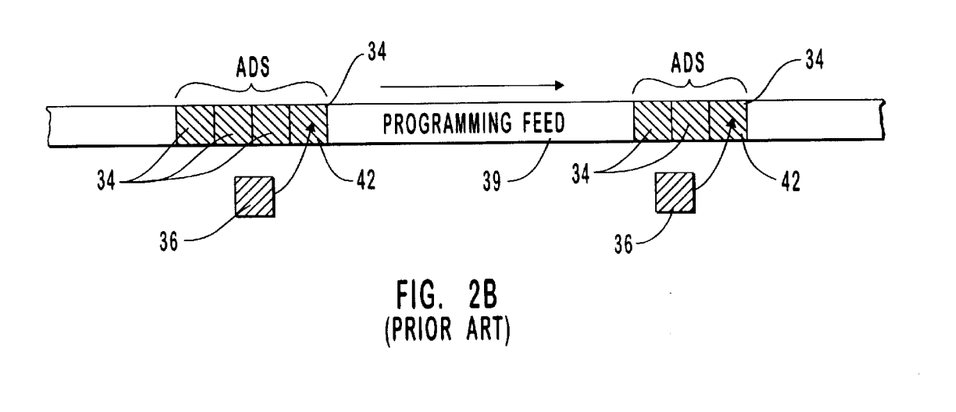
FIG. 2B is a schematic diagram of the insertion of advertisements into a video programming feed by a cable provider as practiced in the prior art.

FIG. 2B illustrates a conventional system whereby a cable provider inserts local advertisements into a video programming feed received from a national broadcaster. In this example, cable network 30 broadcasts a series of advertisements 34 at a predetermined time in its programming feed 39. According to the contractual agreement between the cable provider 32 and the cable network 30, the cable provider is given the option of inserting advertisements 36 into specified time slots 42 in programming feed 39. Because cable providers ordinarily broadcast a large number of channels, many cable providers are unable to sell all the advertising time that is made available by the cable networks. For this reason, cable networks typically broadcast a national advertisement 34 during the specified time slots 42 in recognition that the cable provider may not insert an advertisement 36.

The foregoing systems have been used profitably by advertisers and the television broadcast industry. Advertising revenues are largely responsible for the wide range of television choices currently available to the viewing public. However, even with the widespread practice of targeting viewers based on television programming content and the practice of geographically differentiating advertisements, viewers who are likely to be disinterested in the goods or services offered by advertisers unavoidably constitute a large percentage of the viewing population. For example, even though it may be found that viewers of sports programming are collectively more likely to purchase automobiles, a large number of individual viewers in this segment of the viewing population simply are not interested in such purchases. Likewise, while viewers of news programs may be more interested as a whole in investment services than the general public, a large number of such viewers belong to age or economic segments of the population that traditionally do not make use of investment services. In view of these and many other examples, conventional methods and systems for targeting advertisements to specific groups of viewers are inefficient.

Conventional systems for delivering advertisements to viewers fail to provide accurate feedback mechanisms for gauging viewer response. As seen in FIG. 1, delivery and display of advertisements of advertisements in households 12, 14, and 16 is essentially one-way communication from the advertiser to the viewer. The advertiser is generally unable to determine whether its advertisements have reached the desired segment of the viewing population or whether they have been effective. At most, advertisers are able to monitor business activity before and after a particular advertising campaign or to initiate a direct survey to learn of viewers' perceptions of advertisements. Such approaches are likely to be expensive and inconclusive.

In view of the foregoing, it can be understood that there is a need in the art for systems and methods for more specifically targeting viewers in order to tailor advertisements to the interests and needs of the viewers. Because of the financial incentives involved, both content providers and advertisers would be interested in improved systems for directing television advertisements to interested viewers. A system for selecting advertisements at a more local level than has previously been possible would be a great advancement in the art. Furthermore, it would be advantageous to provide a system for delivering and displaying advertisements wherein the response of the viewers may be accurately measured.

SUMMARY AND OBJECTS OF THE INVENTION

The present invention is directed to methods and systems for inserting advertisements or other video or visually displayed objects into video programming feeds at the household level. The method of invention allows advertisers to target individual viewers based on the needs and interests of individual viewers and households. Advertisement selection and insertion at the household level greatly increases the efficiency of television advertising.

According to one aspect of the method of the invention, a conventional video programming feed is displayed to a viewer. Either before or during the display of the video programming feed to the viewer, a plurality of advertisements from an advertisement source are received by a home entertainment system in the household. The received advertisements are either stored in an advertisement repository for later display or are made available to the home entertainment system at an appropriate time for immediate display.

At least some identifying characteristics of the viewer, the content of the video programming, the geographical location of the household, or other factors, are compiled and are used in combination with designated ad selection criteria in order to select for display an appropriate advertisement. The selected advertisement is appropriate in the sense that it is specifically associated with characteristics of the viewer or the household. Many of the criteria for selecting appropriate advertisements allow targeting of segments of the viewing population in ways that are more efficient and reliable than have been possible before the invention.

During display of the video programming feed, an appropriate time for displaying a selected advertisement to the viewer is indicated by a triggering event. Typically, the appropriate time coincides with advertisements that are originally carried on the video programming feed. The triggering event may be a signal carried in the video programming feed, implied by the timewise structure by the video programming feed, or based on an external mechanism, such as information contained in an electronic program guide. At the appropriate time indicated by the triggering event, the video programming feed is interrupted and the selected advertisement is displayed to the viewer using a display screen of the home entertainment system. In effect, the advertisement originally carried on the video programming feed is overwritten with the selected advertisement. Upon termination of the advertisement, the video programming feed is again displayed to the viewer.

According to one embodiment of the invention, the method includes monitoring the response of the viewer to the selected advertisement. For example, information relating to the viewer response may be stored in the home entertainment system and may be periodically transmitted to a clearinghouse, where the information is made available to the advertisers, the operator of the advertising source, or other interested parties. Thus, the invention allows potentially valuable viewer feedback to be compiled. The viewer response information may allow the advertisers to further modify the content of their advertisements or to change the advertisement selection criteria so as to communicate more effectively to viewers. This can be done by extending the system to include an automatic feedback loop that selects ads based on rules set by the advertiser.

The invention allows advertisements to be more efficiently tailored to the needs and interests of individual viewers than has been previously possible. The advertiser realizes benefits from the invention by maximizing the effectiveness of its efforts of targeting interested viewers. The invention allows the operator of the advertisement source and/or the content providers to increase advertising revenue and to more effectively compete in the advertising market because advertisers are generally willing to pay for the increased advertisement targeting efficiency. Finally, the viewing public benefits by being exposed to consumer information that is more relevant to their needs and interests than has been possible under conventional advertising systems.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention relates to methods and systems for selecting and inserting advertisement into a video programming feed at the household level. The advertisements to be shown to a viewer according to the invention are selected according to designated criteria in combination with information that characterizes the viewer, the content of the video programming feed, the geographical location of the household, or the like in order to efficiently target segments of the viewing population.

For purposes of convenience, the invention is described herein by making primary reference to insertion of advertisements into a video programming stream. However, the video insertion methods of the invention are generally applicable to other forms of video content or video objects beyond advertisements. For example, the video programming that would otherwise be displayed to a viewer may be selectivity replaced with any type of video programming, such as pay-per-view, subscription, special-interest television services, or the like. The term "video objects" extends to advertisements and any other form of video programming, including the foregoing specifically listed types of video programming. Those skilled in the art will recognize, upon learning of the disclosure herein, that the methods of inserting selected advertisements extend to insertion of any other type of desired video programming, video content, or video objects.

As used herein, the term "household" refers to a house or any other site where video programming and advertisements are displayed. Personal residences and businesses where television programming is made available to patrons are intended to be included under the term household. The term "household" also encompasses the viewers in a house or other site, the home entertainment system used to display the video programming and the advertisements, and the content of the video programming displayed at the house or other site.

As used herein, the term "home entertainment system" includes any television or other display screen and the associated hardware and software for displaying the video programming and selected advertisements according to the invention. As further specified herein, some home entertainment systems of the invention have other features, such as video programming recording capabilities or access to the Internet and the World Wide Web.

Embodiments within the scope of the present invention include computer-readable media having computer-executable instructions or data fields stored thereon. The computer-executable instructions may include program code means for executing selected steps of the methods disclosed herein. The computer-readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions or data fields and which can accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 3:
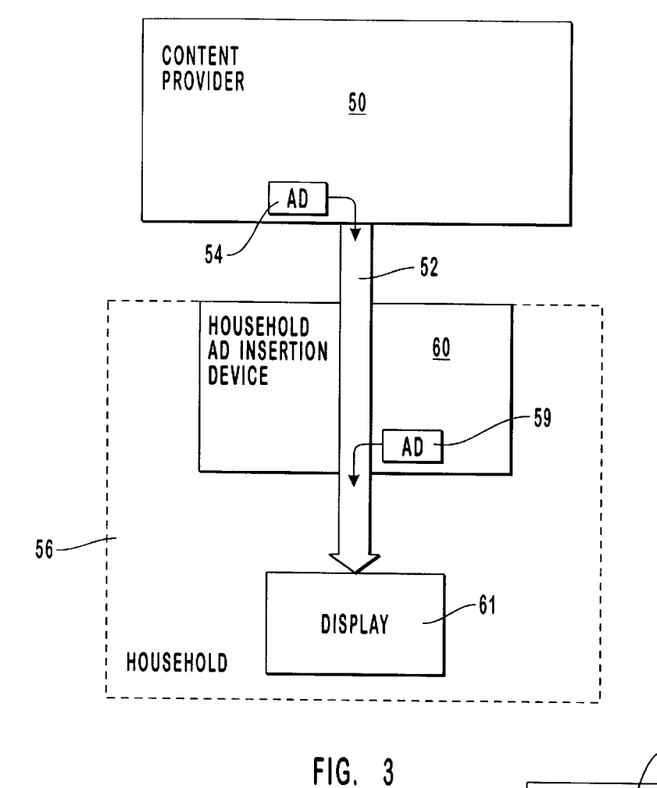
FIG. 3 is a schematic diagram of a system of inserting advertisements into a video programming feed at the household level according to the invention.

FIG. 3 is a high-level diagram of an advertisement insertion system according to the invention. One or more content providers 50 broadcast or otherwise distribute a video programming feed 52. The content providers 50 may include one or more of the content providers 10 shown in FIG. 1. In particular, video programming feed 52 may be provided by a national broadcaster, a local affiliate, a cable network, satellite broadcast networks, or any other source of video programming. Other examples of content providers are local independent television stations, community channels, pay-per-view channels, and videotape or any other medium carrying recorded video programming.

In one embodiment of the invention, the content provider 50 broadcasts advertisements 54 that are included in the video programming feed 52. Advertisements 54 may be of interest nationally or locally as described above in reference to the advertisements of FIG. 1. Video programming feed 52 is transmitted to household 56 via any suitable program delivery channel, such as an over-the-air broadcast, a cable provider, a consumer satellite service, telephone lines, via the Internet, or by any other system for transmitting video data. Any of the foregoing structures or systems are examples of means for delivering a video programming feed to the display device. When a viewer desires to watch the video programming carried by feed 52, the video programming is displayed using display device 58.

At an appropriate time specified by encoded data in video programming feed 52 or by the structure of video programming feed 52, the household advertisement insertion device 60 interrupts the display of the video programming feed 52. An advertisement 59 that has been selected according to any desired method is then displayed to the viewer using display device 58. Preferably, the criteria by which advertisement 59 is selected result in efficient targeting of advertisement 59 to an individual viewer. The source of the selected advertisement and the criteria used to select the advertisement are described in greater detail below.

Examples of the structure and functions of household advertisement insertion device 60 are also described in greater detail below. In one embodiment of the invention, the ad insertion device is embodied in a special purpose computer located at the household where the selected advertisements are displayed. In a particular embodiment of the invention, the special purpose computer embodying the ad insertion device 60 is a home entertainment system component known as a WebTV box available from WebTV Networks, Inc. of Palo Alto, Calif. In particular, the WebTV box may be adapted to perform the finctions described herein for selecting and displaying advertisements at the household level.

In other embodiments of the invention, the ad insertion device 60 may be integrated in a television set that also includes display device 58. Other examples of suitable ad insertion devices 60 may have some components thereof at household 56 and other components at a remote location. For instance, advertisements selected on a household-by-household basis may be distributed by a cable provider using conventional cable television infrastructure. The cable provider may compile household data relating to several households at a central or regional location, where advertisements to be displayed to viewers in the various households are selected. According to further examples, selection of an appropriate advertisements for a particular household may be conducted at a remote location, with the selected advertisement being transmitted to the household at the appropriate time by multiplexing multiple video streams or by use of a conventional telephone network or another communications infrastructure.

Figure 4:
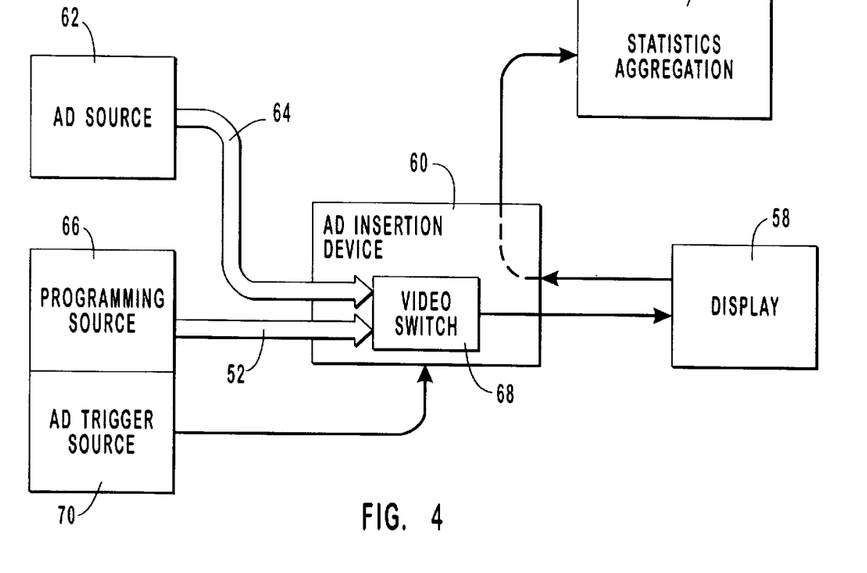
FIG. 4 is a schematic diagram illustrating a system for receiving advertisements from an advertising source and video programming from a programming source according to the invention.

FIG. 4 illustrates in greater detail the sources of advertisements and video programming according to one embodiment of the invention. For example, advertisement source 62 may be a local repository having stored therein a plurality of advertisements, from which an advertisement stream 64 is delivered to the ad insertion device over an advertisement or other video channel. According to another example, advertisement source 62 includes a repository at a central location to serve multiple households. Alternatively, advertisement source 62 may be a just-in-time system for delivering advertisement stream 64 to the ad insertion device.

Any of a number of entities may be the advertisement content provider or, in other words, the party responsible for making the advertisements available to advertisement source 62 and ad insertion device 60. In one embodiment, the advertisement content provider is the advertiser. Alternatively, the advertisement content provider is the same as the video programming content provider. For example, the national broadcaster 20 of FIG. 1 may deliver advertisements to individual households for local selection and display to viewers according to the invention disclosed herein. In another embodiment, a third party advertisement content provider makes the advertisements available to the advertisement source 62 and the ad insertion device 60. In this case, the third party advertisement content provider typically contracts with the advertisers to provide a predetermined type or number of advertisement exposures for the advertisers.

As described above in reference to FIG. 3, a programming source 66, which may be operated by content provider 50, supplies video programming feed 52 to the advertisement insertion device 60. A video switch 68 toggles between video programming feed 52 and selected advertisements of advertisement stream 64 and transmits the selected data feed to display device 58. Video switch 68 may be actuated at an appropriate time indicated by a triggering event delivered by advertisement trigger source 70.

According to one aspect of the invention, the triggering event is a designated signal encoded in video programming feed 52. Alternatively, however, the triggering event may be implied by some mechanism, such as the conventional pattern of advertisements in video programming feed 52. When an implied triggering event is used to initiate display of the selected advertisement, any consistent pattern in video programming feed 52 that is associated with forthcoming advertisements may be used as the implied triggering event. For example, programming sources 66 such as national broadcasters or cable networks often transmit a very brief black screen immediately preceding the onset of a series of advertisements. Such a pattern may be interpreted by ad insertion device 60 and video switch 68 to be a triggering event indicating an appropriate time to insert a selected advertisement.

A predetermined agreement between third party ad source 62 and programming source 66 may be used to ensure that actual triggering events are provided to the ad insertion device 60. In this case, both the third party ad source 62 and programming source 66 may benefit from the ability to specifically target viewers. In contrast, the use of implied triggers or other actual triggering events may be accompanied with unilateral insertion of selected advertisements into the video programming feed 52 on the part of the ad source 62.

In any of the above-described scenarios, the operator of ad source 62 is able to sell advertising opportunities to advertisers or to deliver its own advertisements. It can be understood that an operator of an advertisement source 62 is able to sell advertising time and deliver advertisements to viewers with or without the participation of the operator of programming source 66 or other content providers. However, cooperation between the operator of programming source 66 and the operator of ad source 62 may result in several advantages, such as the ability to use explicit trigger signals rather than implied trigger signals.

In one embodiment, the advertisements delivered from ad source 62 are inexpensively converted from traditionally non-video media. For example, text, graphics, pictures, or audio from a computer generated document (i.e., an HTML page) is converted into a video display such as a freeze-frame or slide show. This method is particularly useful for community-scale advertisements originating from advertisers that traditionally have not had access to television or advertising production resources for economic or other reasons. To illustrate, a school could transmit and display computer-generated text to viewers within the school boundaries in order to inform parents of school events or policies.

FIG. 4 further illustrates an optional aspect of the invention whereby viewer responses to the selected advertisements are compiled and periodically reported. In this embodiment, the ad insertion device 60 monitors actions of the viewer before, during or after display of the selected advertisement. Examples of such actions include channel changes during display of the selected advertisement, requests by the viewer for additional information, feedback provided by the viewer in response to the advertisement, and the like. In a further example, the user may be presented with multiple ads and asked to select one for viewing. Information about which ad has been selected may also be compiled. Such interaction between the viewer of the advertisement and the home entertainment system allows advertisers to more effectively target interested viewers or to test a proposed advertisement on a limited segment of the viewing population while receiving valuable feedback relating to the popularity or effectiveness of the advertisement.

When the optional viewer response monitoring feature is employed, the systems of the invention include means for collecting information relating to actions of the viewer in response to the displayed advertisement. For example, viewer response information is collected in a statistics collection location 61, which may be located at the home entertainment system or at a remote site. According to one option, viewer response information is compiled and stored at a statistics collection location 61 that is located within the household. The viewer response information may be periodically sent to a clearinghouse where the information may be aggregated and made available to the operator of the advertisement source 62, the advertisers, or other interested parties. In addition, or in the alternative, the viewer response information remains at the ad insertion device to further modify the advertisement selection process as is described below in greater detail.

Because many households include more than one viewer, the home entertainment system and the methods of the invention optionally include means for identifying the viewer. In one example, the means for identifying the viewer includes a login screen or protocol, which requires the viewer or viewers to identify themselves each time video programming is watched. When the invention is incorporated in a Web TV box or another Internet access system, the login structure and protocol may be combined with the system for logging into to Internet access system. In another example, the means for identifying the viewer includes statistics collection location 61 in combination with computer-executable instructions for deriving or making a best estimate of the identity of the viewer based on current and past viewing habits.

Because one implementation utilizes a WebTV box, a mechanism to transmit viewer response information from the ad insertion device is provided, such as phone lines, cable modems, Internet or World Wide Web connections, etc. For example, viewer response statistics may be collected on a World Wide Web site, compiled, sent, or made available, all automatically, using existing technology or with little user intervention. In implementations using ad insertion devices that are not embodied in a WebTV box, the data channel for sending viewer response statistics may also include phone lines, cable modems, or Internet or World Wide Web connections.

Figure 5:
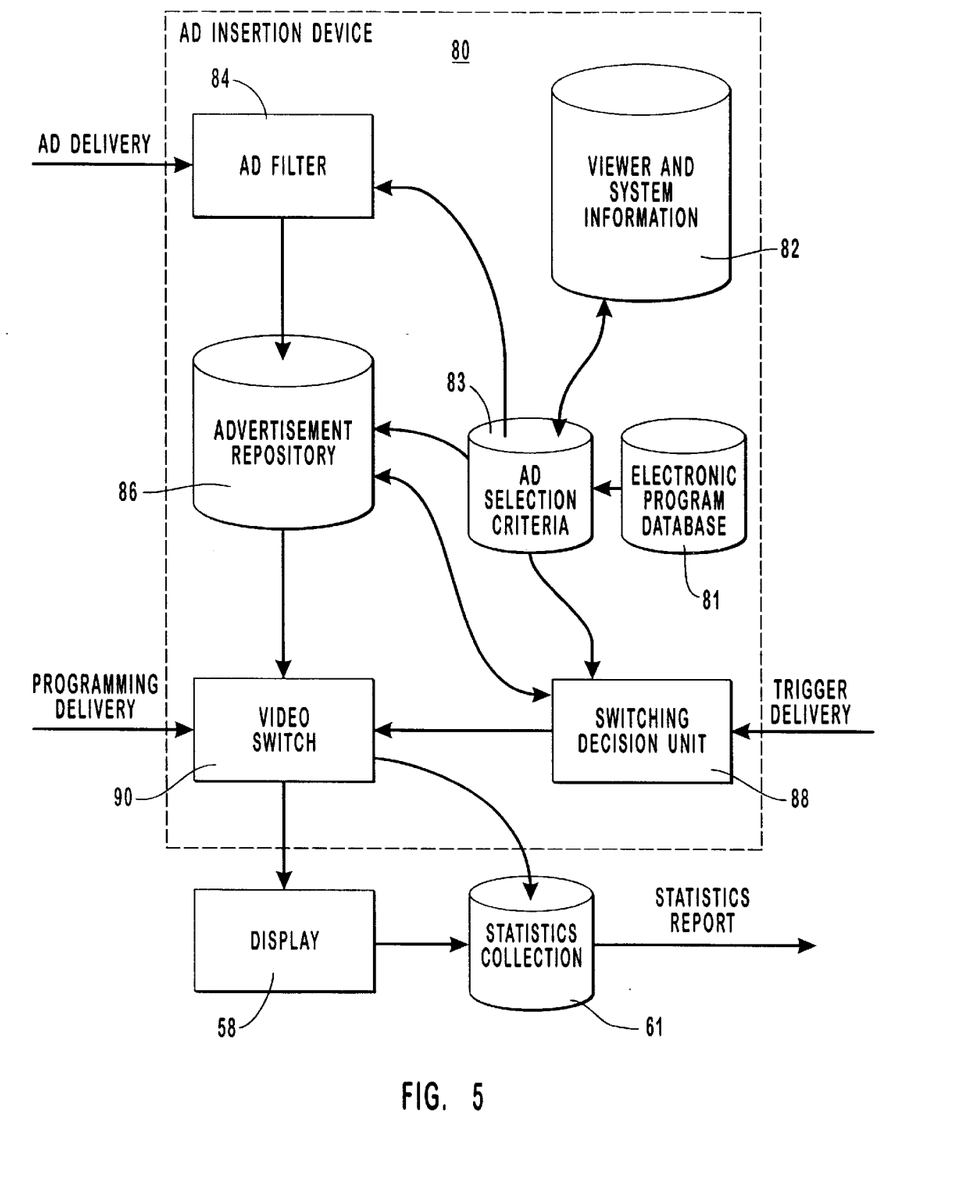
FIG. 5 is a schematic diagram depicting in greater detail an advertisement insertion device of the invention.

FIG. 5 further illustrates the components and operation of an ad insertion device according to the invention. In particular, FIG. 5 illustrates an embodiment of the invention wherein a plurality of advertisements are periodically delivered to the ad insertion device and are stored therein in preparation for selection and display of one or more of the advertisements. Ad insertion device 80 may advantageously be a WebTV box having been adapted to include the structure and perform the functions described herein. Ad insertion device 80 includes means for storing household data, which may include viewer and system information. One example of such means for storing household data is a storage location 82 shown in FIG. 5. Storage location 82 may comprise any computer-readable medium for storing data fields thereon. The viewer and system information of storage location 82 may include any of a wide range of household data for characterizing the viewer, the geographical location of the household, the features of the ad insertion device and the home entertainment system, and the like.

The viewer and system information may include data provided by the viewer upon initiation of the services provided by the ad insertion device 80, such as a voluntary survey or questionnaire filled out during the registration process. During ongoing operation of the ad insertion device 80, the viewer and system information may be updated automatically in order to characterize the viewing habits of the viewers. It will be understood that as more detailed information relating to the viewer and the other factors disclosed herein is accumulated, the appropriate advertisements to be displayed on display device 58 may be more effectively identified.

Specific examples of the viewer and system information stored in storage location 82 include the following. Viewer demographic data may be stored in storage location 82, including age, sex, income, preferred language, number of residents, or similar information. Such demographic information may be provided directly by the viewer or may be obtained from a third party source and associated with the household using address information. The geographical location may also be included and may be specified by city, neighborhood or the street address of the household, and the local time at the household may be monitored. Storage location 82 may also store content ratings or parental lock codes when the home entertainment system is compatible with such features. The viewer may also be permitted to specify his or her hobbies, interests, spending habits, and anticipated major purchases.

According to one implementation, the ad insertion devices of the invention further comprise means for identifying the content of television programs carried on the video programming feed. One example of such means is an electronic program database 81 that associates specific television programs with specific time slots and television channels. Furthermore, electronic program database 81 may include program descriptions associated with the television programs listed therein. Electronic program databases having the foregoing features and methods for delivering the electronic program databases to home entertainment systems are well known in the art. Another example of means for identifying the content of the television programs includes computer-readable medium carrying program code for monitoring the content of the closed captioning signal that is conventionally broadcast with the video and audio portions of the television program.

The viewer and system information may further include information relating to the viewing habits of the viewers in the household. The viewing habits may be described by monitoring the times of day that programming is watched, the amount of time spent viewing particular channels, preferred types of programming, etc. In some embodiments, ad insertion device 80 is included in a home entertainment system component such as a WebTV box that also has Internet and World Wide Web browsing capabilities. Monitoring preferred Internet sites may provide useful information to be stored in storage location 82 in order to further specify the preferences and background of the viewer. In view of the foregoing, it is to be understood that the types of viewer and system information stored in storage location 82 may be any desired data that characterizes the viewer, the features of the home entertainment system, the content of the video programming feed, the geographical location of the household, and the like.

Ad selection criteria 83 are stored in ad insertion device 80 for use in combination with the viewer and system information 82 and/or the electronic program database 81 in order to select appropriate advertisements to be displayed to the viewer. Typical ad selection criteria include both advertisement parameters associated with particular advertisements and ad selection rules. The advertisement parameters include, for example, a description of the content of the advertisement, codes that identify the subject matter of the advertisement, or other mechanisms for characterizing the advertisement so that the advertisement may be displayed to an appropriate segment of the viewing population. According to one implementation, the ad selection rules are used to match the viewer and system information of storage location 82 or the programming content information of electronic program database 81 with the advertisement parameters associated with the advertisements. In this way, the ad selection criteria 83 may be used to efficiently target desired viewers of particular advertisements.

The ad selection rules of ad selection criteria 83 may be predefined by the advertisers, the video programming content provider, a third party operator of the advertisement source 62, or, in some cases, by the viewer. It can be understood that the source of the ad selection rules may be determined according to an agreement between the parties. Alternatively, the methods of the invention disclosed herein may be unilaterally practiced by any one of the foregoing entities, in which case, the particular entity may exercise sole control over the choice of ad selection criteria. The ad selection rules can change over time as more viewer and system information and viewer response information is compiled. In general, the ad selection rules may be designated in any desired way so as to effectively target individuals that belong to a desired segment of the viewing population.

The initial ad selection rules and any updated versions thereof may be delivered to the ad insertion device 80 according to one of a number of methods. The delivery channel of the ad selection rules may be the same as the advertisement delivery channel. For example, ad selection rules may be delivered over telephone, over broadcast signals or downloaded from the World Wide Web. Alternatively, the ad selection rules may be delivered to the ad insertion device 80 by any available delivery channel independent from the delivery of the advertisement stream and the video programming feed. In another implementation, preinstalled initial ad selection rules are included in new ad insertion devices and the associated home entertainment systems. Furthermore, the ad selection rules may be automatically modified as more viewer and household information is compiled.

Advertisement parameters associated with particular advertisements are generally assigned by the advertiser, the operator of the advertising source 62, or the video programming content provider. In general, the entity that has an incentive for efficient targeting of advertisements to selected segments of the viewing population will likely ensure that appropriate advertising parameters are associated with the advertisements. Often, the advertiser or an advertising firm representing the advertiser will ensure that advertisement parameters are attached to the advertisement.

The advertisement parameters may be conveniently delivered to the ad selection device 80 at the same time as the advertising feed, using the same delivery channel. While other methods of delivering advertising parameters are possible, delivery of the advertisement parameters with the associated advertisements provides relatively easy correlation between the parameters and the advertisements.

The systems disclosed herein for selecting an appropriate advertisement for display, including the storage location for the ad selection criteria 83 and the storage location 82 for the viewer and system information, constitute examples of means for selecting one of a plurality of advertisements for display to a viewer. With respect to many of the following examples of ad selection criteria, it can be understood that a viewer in a first household is often shown a different advertisement than a viewer in another home, even though the viewers may be watching the same video programming feed.

The following discussion of alternative types of advertisement selection criteria provides examples of how the operator of advertisement source 62 and the advertiser may specifically target desired viewers. Based on the programming information contained in the electronic program database 81, the ad selection criteria 83 may select specific advertisements according to a particular program being viewed. This selection criteria is similar to the selection process frequently used in conventional broadcast systems as described above in reference to FIG. 1. However, according to the invention, an advertiser may specify that its advertisement is to be shown during a particular program regardless of the network on which the program is broadcast. For example, if a syndicated sitcom or other program is broadcast on multiple networks, a selected advertisement may be shown regardless of which network is being viewed.

The programming descriptions contained in the electronic program database 81 may be used selected an advertisement according to the subject matter of a particular program. For example, an advertiser for a current-release motion picture may request that the ad selection criteria 83 identify all television programs featuring the cast members of the motion picture. Thus, when a star of the motion picture appears on a television talk show, an advertisement for the motion picture may be shown during a commercial break. It will be appreciated that the subject matter of the television program may be identified using the descriptions in the electronic program database 81, by monitoring the contents of the closed captioning information, or by any other desired method.

The ad selection criteria may further be used to choose advertisements that are compatible with television viewing habits of the viewer, the preferred Internet or World Wide Web sites, previous Internet purchases made using the home entertainment system, responses to consumer habits and preferences surveys, and the like. In addition, advertisements can be selected in response to the viewing habits of a viewer with respect to advertisements in general. For example, many viewers habitually change the television channel whenever an advertisement is shown. Such aggressive "channel surfers" are often able to avoid a large percentage of advertisements simply by tuning into channels that are broadcasting programming. In response to channel surfers, the invention may be adapted in one of several ways. In a first example, video switch 90 of FIG. 5 inserts one particular advertisement into each advertisement slot that the channel surfer encounters as he or she progresses through the channel lineup. In this way, the channel surfer is repeatedly exposed to at least bits and pieces of the one particular advertisement. Eventually, given enough time and channel changes, the commercial message of the particular advertisement is communicated to the channel surfer.

In a second example, the video programming broadcast to the home entertainment system from multiple content providers or television channels is coordinated so that each channel simultaneously broadcasts advertisement slots. In this example, a selected advertisement is displayed simultaneously on all of the multiple channels, so the advertiser ensures that instant coverage is made to viewers watching any of a large number of channels. Such "blanket saturation" is effective, not only to reach channel surfers, but also to reliably target any desired segment of the viewing population.

In one embodiment, statistics collection location 61 of FIG. 5 counts the number of times a particular viewer has seen a selected advertisement. Once the advertisement has been displayed the desired number of times during a given time period, further display of the advertisement to the viewer is blocked. This is useful, for example, to prevent viewers from becoming frustrated through being excessively exposed to the selected advertisement.

The ad selection criteria 83 could be used to select advertisements having different content ratings depending on the content rating of the program being watched by the viewer. Alternatively, the content rating of the selected advertisement may be coordinated with parental lock codes or other indications of preferred or permissible programming content stored in the home entertainment system. Content rating selection may be used to choose between different versions of an advertisement for one product, one example being an Rrated and a PG-rated trailer for a motion picture.

Local time may be used to select an appropriate advertisement in situations where a program is broadcast simultaneously to viewers in different time zones. For examples, satellite television subscribers on the West Coast often have access to the East Coast feeds of national broadcasters and cable networks. Accordingly, the ad selection criteria could ensure that certain advertisements are shown at the time of day desired by the advertiser (i.e., showing "late nite" ads vs. "primetime" ads).

The system of the invention may be used to select appropriate advertisements based at least in part on whether the video programming feed is watched as it is broadcast or being replayed from recorded media. Certain advertisements have time-sensitive subject matter, such as those that present commercial offers for a limited time. Advertisers can update time-sensitive advertisements when such advertisements have been recorded, so as not to present obsolete information to the viewer. Furthermore, according to the methods of the invention advertisements originally recorded on videotape or another recorded medium can be re placed with effectively targeted ads based on any other desired criteria.

The ad selection criteria may further be used to choose advertisements based on the content of recently displayed advertisements. For example, an advertiser for one car manufacturer may want to preclude advertisements from other automobile manufacturers. Alternatively, an advertiser may wish to display an advertisement to a viewer directly after an advertisement of a competitor in order to highlight the competitive advantages of its goods or services. Such flexibility allows advertisers to display their advertisements at a time that is likely to provide the greatest impact on the viewer.

The ad selection criteria may be set or modified by the viewer, as well, in order to request or block advertisements for selected classes of goods or services. This optional feature of the invention advantageously allows the viewer to participate in a selection of advertisements. In an extreme case, the ad selection criteria 83 may be modified in response to, for example, increased subscription fees from the viewer in order to allow the viewer to forego advertisements altogether. In this case, advertisements may be replaced by entertainment, informational, or any other programming.

Advertisement selection may further be conducted according to the identified viewer demographic information. Certain goods or services may appeal primarily to either men or women, to certain age groups, or persons of certain income levels. Accordingly, advertisers using the methods disclosed herein are able to reliably identify members of the desired segment of the viewing population according to the demographic information stored in storage location 82. It can be understood that using specific information relating to the viewers in a household is significantly more efficient than relying on estimated or average demographic characteristics of viewers of individual programs and program types.

The ad selection criteria 83 further have the capability of targeting advertisements to narrowly defined geographical areas. Accordingly, advertisers may direct their advertisements only to viewers living in selected streets, neighborhoods, cities, or the like. According to further alternative ad selection criteria, advertisers may pay for a guaranteed number of exposures. In yet another variation, advertisements are displayed in a small number of households, while detailed viewer response information is gathered in a focus group-type arrangement.

In view of the foregoing, those of skill in the art will understand that many other ad selection criteria or viewer and system information may be used to effectively select appropriate advertisements. The specific examples disclosed above are not to limit the scope of the invention, but serve instead to illustrate suitable and presently preferred embodiments of the invention.

Returning to the embodiment shown in FIG. 5, the ad insertion device 80 includes means for receiving an advertisement stream, including a plurality of advertisements. One example of such means includes telephone lines. In many cases, the telephone line connected to ad insertion device 80 is a shared line that also provides conventional residential telephone service to the household. Ad insertion device 80 initiates a telephone call on a periodic basis to an advertisement source to request a download of advertisements. When the telephone line connected to ad insertion device is a shared line, the periodic calls are preferably conducted during the nighttime hours or at another time of day when the likelihood of conflict with residential use of the telephone line is reduced. Alternatively, the means for receiving the advertisement stream may include any other advertisement delivery channel, such as an over-the-air broadcast, a cable provider, a consumer satellite service, a data transport, such as an Internet connection, or any other system for transmitting video data.

FIG. 5 illustrates an optional ad filter device 84 used to pre-screen and accept only selected advertisements from the ad delivery source. Such a prefiltering process is useful when an advertisement repository 86 is capable of storing a limited number of advertisements. The advertisements are filtered by ad filter device 84 according to the ad selection criteria stored at storage location 83.

Advertisement repository 86 contains a cache of delivered advertisements that optionally have been prefiltered. Accordingly, advertisement repository 86 is but one example of means for storing a plurality of advertisements. Advertisement repository 86 may comprise any computer readable medium capable of storing digitally encoded video programming and later making the encoded programming available for display to a viewer. Alternatively, advertisement repository 86 may comprise conventional magnetic video tape or another recording medium for storing an analog version of the video programming feed.

Ad insertion device 80 includes means for detecting a triggering event indicating an appropriate time to display the selected advertisement. One example of such means includes a switching decision unit 88 that monitors a trigger delivery channel in order to identify the triggering event. However, the means for detecting a triggering event may instead include computer-executable instructions carried on a computer-readable medium for analyzing the structure of a video programming feed and identifying a virtual triggering event as described herein.

As discussed above with respect to FIG. 4, the triggering delivery channel may be combined with the delivery of the video programming feed. In one embodiment the triggering signal is transmitted during the vertical blanking interval (VBI) of a television signal. The triggering signal may be encoded in the broadcast by a content provider that has agreed to cooperate in the ad insertion system of the invention. Because the triggering signal appears in the video programming feed at a pre-identified or otherwise determined period of time before the onset of a subsequent advertisement series, the ad insertion device 80 may thereby determine the precise time for inserting a selected advertisement. When switching decision unit 88 identifies the presence of a triggering signal, whether actual or implied, it prompts video switch 90 to interrupt display of the video programming feed and to insert in its place the selected advertisement from advertisement repository 86. Video switch 90 is but one example of means for interrupting delivery of the video programming feed and delivering, at the appropriate time, the selected advertisement to the display device.

In an alternative embodiment of ad insertion devices of the invention, advertisement repository 86 is replaced with a virtual advertisement storage system, whereby advertisements are delivered to the ad insertion device, selected, and displayed "on the fly" without any actual intermediate storage of the advertisements in the ad insertion device. This method of "streaming" advertisement data is useful in home entertainment systems having small or no hard drive or other data storage devices. According to the streaming method, a video programming stream is multiplexed with one or more advertisement streams, thereby providing a periodic or constant stream of advertisements, any of which may be selected and displayed to the viewer in real-time. The multiplexing method can be in-band by splitting a digital stream into multiple lower bandwidth streams, and distributing the video programming stream and the advertisement streams among the lower bandwidth streams. Alternately, the multiplexing method can be out-of-band, in which multiple channels, including a video programming channel and one or more advertisement channels, are simultaneously transmitted.

The video switch 90 selects between a real-time video programming feed and a real-time advertisement feed. In one example of this approach, the advertisement delivery channel delivers, in real time, two or more advertisements synchronized to start in unison with the beginning of the advertisement time slot in the video programming feed. Another embodiment may have very limited ad storage capability, perhaps two or three ads for each time slot, and receive the ads encoded in the broadcast signal just before selection and display.

In yet another embodiment, advertisements are selected and inserted into a video programming stream without regard to the position of the conventional advertising slot. Instead of an appropriate time determined by the content of the programming or by any other desired criteria, the video programming is interrupted and one or more selected advertisements are displayed. In this embodiment a delay code is embedded in the video programming, which functions to delay or pause the programming during the length of the advertisements. Once the advertisements are completed, the paused programming resumes. From the standpoint of the viewer, such ad insertion appears to be no different than the other embodiments of the invention.

In one implementation, the ad delivery of FIG. 5 is conducted by transmitting the advertisements on a piecemeal basis during transmission of a typical analog television broadcast. The advertisements can be received by advertisement repository 86 during the vertical blanking intervals of the television signal. In this manner, the advertisements can be transmitted without an increase in bandwidth or the use of dedicated delivery channels. In view of the foregoing and the other methods disclosed herein, it can be understood that the ad delivery may be a real-time feed, a relatively slow and ongoing process, a download of a relatively large number of advertisements during a short period, or any intermediate combination of the foregoing.

In another alternative embodiment, the ad insertion device permits the viewer to insert a "bookmark" in an advertisement of interest. Inserting a bookmark involves saving all or selected information of the advertisement for later retrieval or reference. A bookmark corresponding to an advertisement of interest may be saved in advertisement repository 86 or in another storage site in the ad insertion device or the home entertainment system.

In yet another embodiment, two or more appropriate advertisements are selected for an available time slot in the video programming feed. Each of the two or more selected advertisements is displayed at the appropriate time using a split-screen or another arrangement by which the viewer may see both advertisements. The viewer then has the option of choosing one of the displayed advertisements that is of greatest interest. A default or machine-selected ad can be displayed if no selection is made. This method of displaying multiple advertisements gives the viewer an increased degree of interactivity with respect to the selection of the advertisements.

Figure 6:
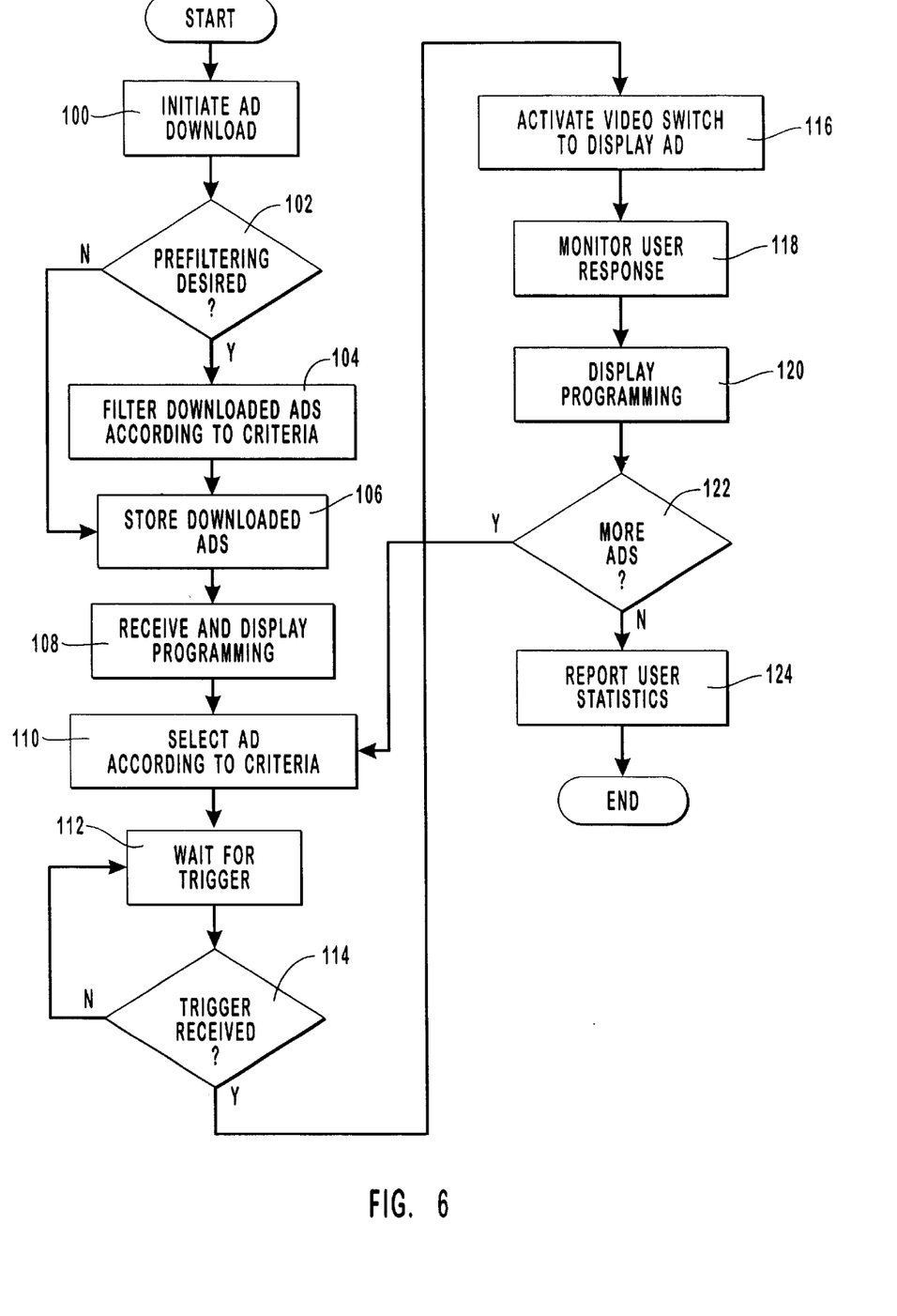
FIG. 6 is a flow diagram showing selected steps of a method of selecting and displaying advertisements using the advertisement insertion device of FIG. 5.

FIG. 6 is a flow chart illustrating selected steps in one embodiment of a method for inserting,an advertisement into a video programming feed using the ad insertion device 80 of FIG. 5. In step 100, the downloading of advertisements is initiated according to the methods disclosed herein. If, according to decision box 102, prefiltering is desired in order to select only certain advertisement for storage in the advertisement repository 86, the ad selection criteria are used to filter the advertisements in step 104. In step 106, the downloaded advertisements, whether prefiltered or not, are stored in advertisement repository 86.

At a time selected by the viewer, the home entertainment system in step 108 receives video programming from a content provider and displays the video programming. In step 110, a stored advertisement is selected according to the selection criteria as described herein. In step 112, the ad insertion device waits for a triggering event that indicates an appropriate time to insert the selected advertisement. When a triggering event is received according to decision box 114, the video switch is activated in step 1 16, thereby interrupting the display of the video programming feed and displaying the selected advertisement.

In an optional step, the viewer response to the displayed advertisement is monitored in step 118 according to the methods disclosed herein. When the selected advertisement is complete, the video switch resumes transmitting the video programming feed to the display device in step 120. According to decision box 122, depending on the availability of more advertisements and whether the viewer chooses to continue watching the video programming fee, the ad insertion device either selects a new advertisement in step 110 or the method proceeds to its close. If no more advertisements are to be shown, the compiled viewer response statistics are optionally reported in step 124 to the operator of the advertisement source or to a third party. If viewer response statistics are to be reported, they may be transmitted from the ad insertion device at any convenient time. Step 124 can be performed on a periodic basis, such as once per day or once per week.

Figure 7:
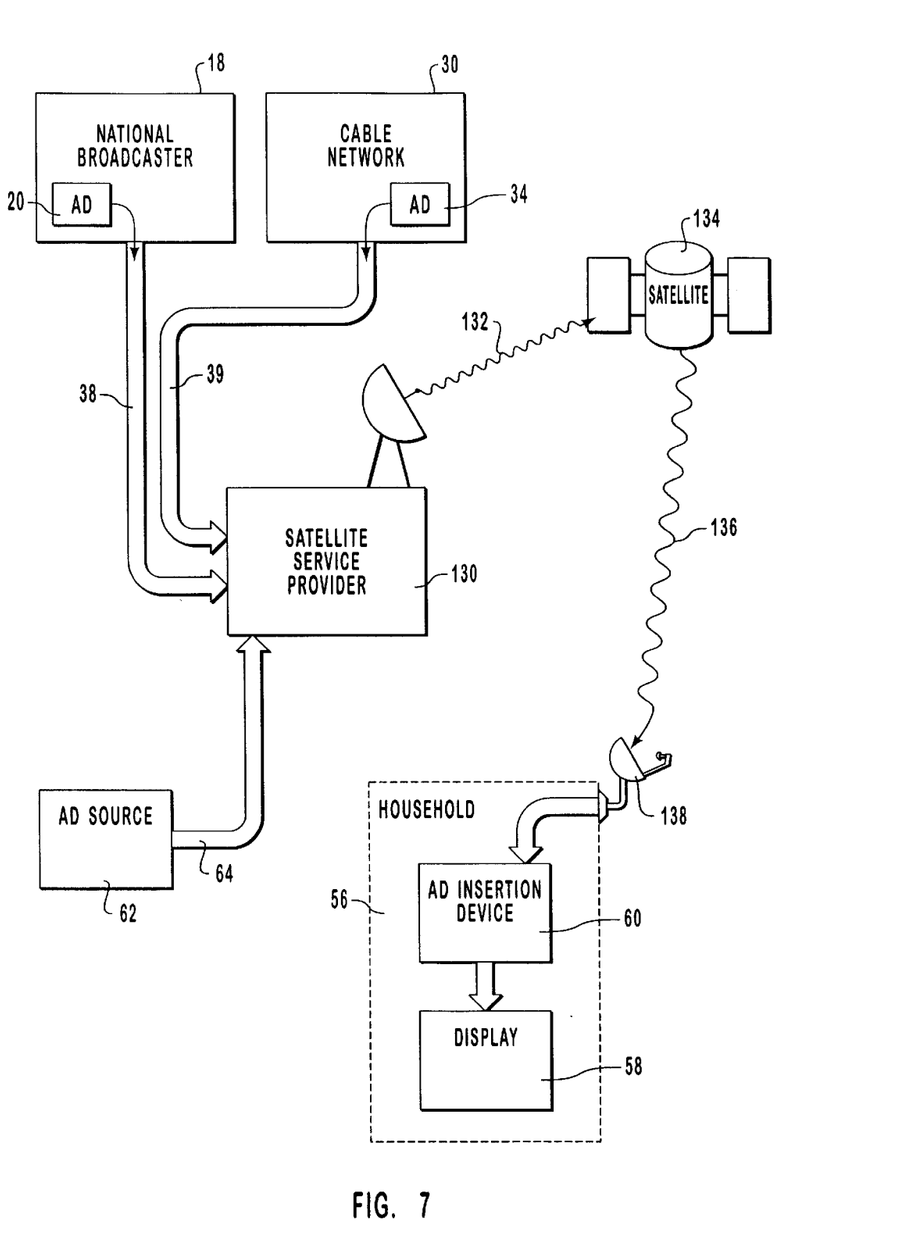
FIG. 7 is a schematic diagram illustrating a satellite system for broadcasting advertisements to a household, where a selected advertisement is displayed according to the invention.

FIG. 7 illustrates a further embodiment of the invention, wherein the video programming and, optionally, the advertisements to be inserted in the video programming, are delivered by means of a satellite broadcast system. It is well known in the art that satellite service providers may be advantageously used to deliver video programming to viewers, and are thus an alternative to cable providers, over-the-air broadcasts, and other broadcasting methods. In FIG. 7, national broadcaster 18 and cable network 30 make their programming feeds 38 and 39 available to satellite service provider 130, which then uplinks an analog or digital data stream 132 to satellite 134. Advertisements 20 and 34 are typically included in advertisement slots in the programming feeds 38 and 39.

According to the invention, an ad source 62 provides an advertisement stream 64, which is also transmitted by satellite service provider 130. Satellite 134 transmits signals 136 that include programming feeds 38 and 39 and advertisement stream 64 to a receiver unit 138 at household 56. In this manner, the system of FIG. 7 allows video programming and an advertisement stream to reach household 56. Thereafter, ad insertion device 60 is used to select and display advertisements on display device 58 according to the methods disclosed herein.

In one implementation, ad source 62 transmits advertisement streams 64 only periodically over satellite 134, in which case, a device such as advertisement repository 86 of FIG. 5 may be used to store the transmitted advertisements for later selection and display. For example, advertisement stream 64 may be broadcast on a dedicated channel during a late night period of time when relatively few viewers are watching television. Optionally, when a periodic broadcast technique is employed, advertisement stream 64 may be broadcast on the same channel used by national broadcaster 18 or cable network 30, but at an hour when the national broadcaster or cable network is otherwise off the air. According to yet another alternative, national broadcaster 18 and cable network 30 may choose to multiplex advertisement stream 64 into video programming feeds 38 and 39. Furthermore, the satellite service provider 130 may instead be used to broadcast only video programming feeds 38 and 39, while another system is used to deliver advertisement stream 64 to household 56. For example, the system of FIG. 7 may be modified by delivering advertisement stream over-the-air, by telephone lines, or by any other technique disclosed herein.

While the invention has been described herein primarily in reference to inserting advertisements, it is to be understood that the invention is not limited to advertisements, but instead extends to inserting any desired type of video programming or other video objects into a video programming stream. For example, ad source 62 of FIG. 4 may instead be a source of any desired video programming, such as pay-per-view, subscription, special-interest television programming, video Internet broadcasts, and the like.

Figure 8:
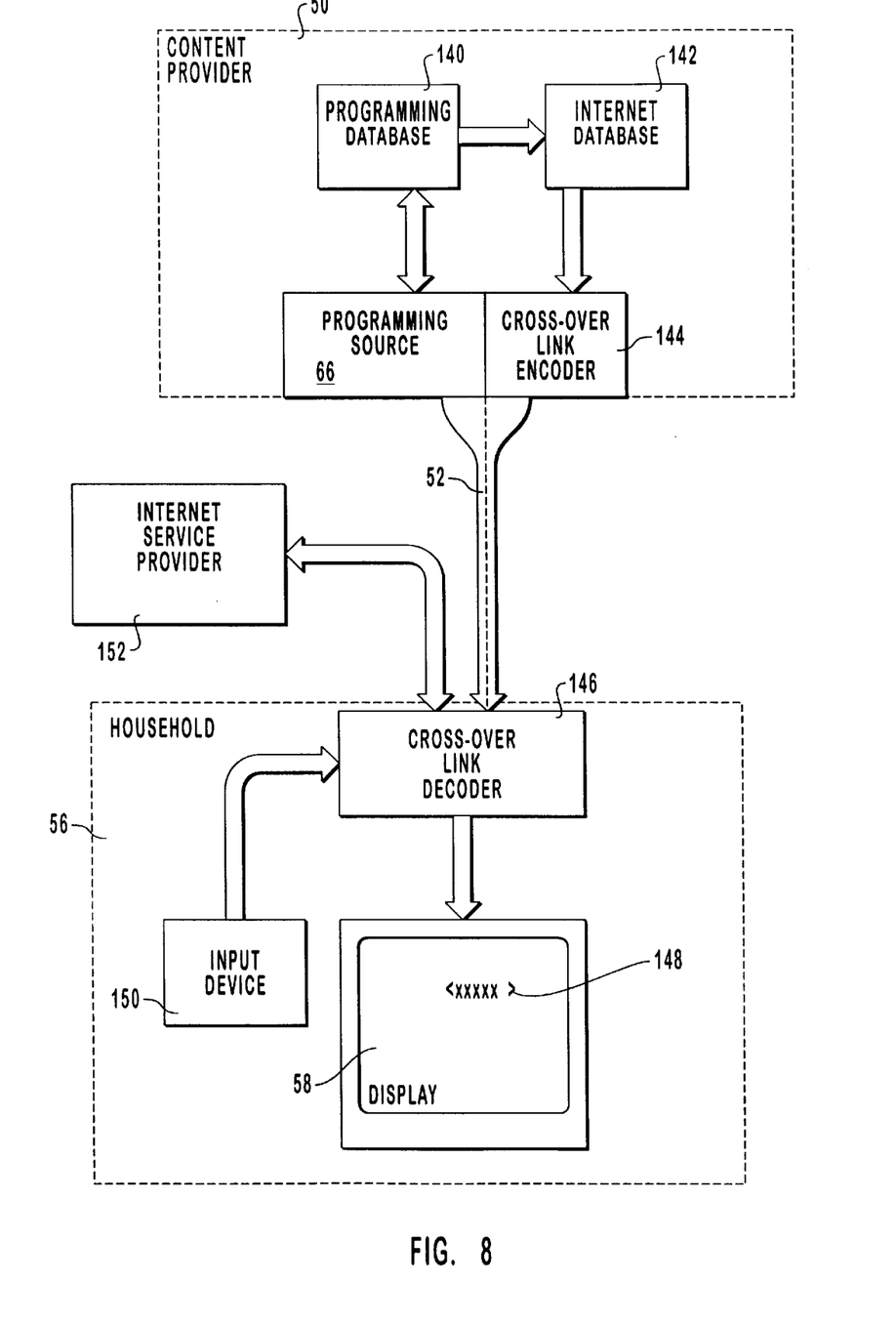
FIG. 8 is a schematic diagram of a system for embedding Internet links in a television broadcast.

FIG. 8 illustrates a further embodiment of the invention, in which a "cross-over" link, such as an active Internet link, is embedded, inserted, or overlaid on video programming. In particular, a content provider 50 encodes cross-over links, including an information retrieval address, in a video programming feed 52. According to one embodiment for encoding cross-over links, content provider 50 includes a programming source 66 and a programming database 140 that includes information relating to the program description, or topics, dialog, persons, brand names, etc., that appear in the video programming feed 52. Programming database 140 is associated with an Internet database 142 or a database associated with another information service. Internet database 142, includes, for example, selected Internet sites that pertain to any of a wide variety of topics and subjects. Internet database 142 and programming database 140 can be used to identify and select Internet sites that relate to the video programming feed 52 according to desired rules and parameters. When a selected topic or subject is being broadcast in video programming feed 52, an information retrieval address corresponding to one or more related Internet sites is encoded in the video programming feed by, for example, cross-over link encoder 144. In one implementation, an Internet address is encoded in the video programming feed 52 during the vertical blanking interval.

Video programming feed 52, including the encoded cross-over link, is delivered to household 56 according to any desired method. A cross-over link decoder 146 extracts the cross-over link information from video programming feed 52. WebTV boxes are one example of devices that support link decoding. The decoded cross-over link 148 may then be displayed on display device 58. For example, cross-over links 148 may be displayed by overlaying the link on a conventional television display, by generating a split-screen display, or by any other desired method. Cross-over link 148 is thus a visually displayed object that offers the viewer access to further information relating to the topic or subject that is simultaneously displayed on the video programming of display device 58.

A viewer is then permitted to select the cross-over link 148 by use of a remote control device or another input device 150. Selection of cross-over link 148 initiates a request to an Internet service provider 152 or another information service provider for retrieval of the information, such as a World Wide Web page, associated with the selected cross-over link. The selected information is retrieved by Internet service provider 152 and is delivered to household 56 via an information delivery channel for display on display device 58. The retrieved information may be displayed by interrupting the video programming feed and inserting the information on display device 58, by generating nested display windows so as to avoid interrupting the video programming, or by any other desired method.

The invention also extends to methods for collecting and reporting viewer response information. For example, regardless of the advertisement selection rules and criteria, actions taken by viewers in response to particular advertisements may be collected at statistics collection location 61 or another suitable device and periodically reported to the advertiser, the ad source, or another party. It is to be understood that such methods of collecting and reporting viewer response information is encompassed by the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a household home entertainment system comprised of a display device for receiving and displaying video programming received from a video content provider, and a computing system for controlling at selected times the source of the video content to be displayed, and particularly the source and nature of advertising content, a method for controlling and determining locally at the home entertainment system the advertising content to be displayed from time to time for one or more users of the home entertainment system when viewing video programming received from a video content provider, the method comprising steps for:

storing at the computing system criteria for selecting some advertising content and not other, the criteria being based on factors provided from any one or any combination of i) a user profile for one of the one or more users viewing the video programming, ii) a video programming content provider, iii) a third party operator, and iv) an advertiser;

receiving at the home entertainment system advertising content from an ad source, and subsequently deciding whether to prefilter at least some of the received advertising content using the stored criteria, and thereafter storing at the computing system any received and prefiltered advertising content;

receiving and displaying at the display device video programming provided by a video content provider; and using the stored criteria, and while the video programming is being displayed, the computing system detecting a predefined triggering event, and then selecting advertising content to be displayed and displaying it by performing one or both of i) inserting from advertising content stored locally at the computing system at least some of the selected advertising content into the video programming being displayed, and ii) using the stored criteria at the computing system, screening advertising content included with the video programming to display some but less than all of the included advertising content.

2. In a household home entertainment system comprised of a display device for receiving and displaying video programming received from a video content provider, and a computing system for controlling at selected times the source of the video content to be displayed, and particularly the source and nature of advertising content, a computer program product comprising a computer readable medium for carrying executable instructions for implementing a method for controlling and determining locally at the home entertainment system the advertising content to be displayed from time to time for one or more users of the home entertainment system when viewing video programming received from a video content provider, and wherein the method is comprised of steps for:

storing at the computing system criteria for selecting some advertising content and not other, the criteria being based on factors provided from any one or any combination of i) a user profile for one of the one or more users viewing the video programming, ii) a video programming content provider, iii) a third party operator, and iv) an advertiser;

receiving at the home entertainment system advertising content from an ad source, and subsequently deciding whether to prefilter at least some of the received advertising content using the stored criteria, and thereafter storing at the computing system any received and prefiltered advertising content;

receiving and displaying at the display device video programming provided by a video content provider; and using the stored criteria, and while the video programming is being displayed, the computing system detecting a predefined triggering event, and then selecting advertising content to be displayed and displaying it by performing one or both of i) inserting from advertising content stored locally at the computing system at least some of the selected advertising content into the video programming being displayed, and ii) using the stored criteria at the computing system, screening advertising content included with the video programming to display some but less than all of the included advertising content.

3. A method as recited in claims 1 or 2, further comprising the step for monitoring the video programming in order to detect a triggering signal, wherein detection of the predefined triggering signal is the triggering event.

4. A method as recited in claims 1 or a wherein the triggering event is derived from the structure of a video programming feed used for providing the video programming.

5. A method as recited in claims 1 or 2, wherein the criteria based on factors provided from said user profile further comprises a step for compiling and storing household data characterizing the home entertainment system.

6. A method as recited in claims 1 or 2, further comprising a step for identifying a television program being carried on said video programming, and wherein the stored criteria provides that a specific advertisement is to be selected for display during said identified television program, independent of any particular television channel on which said identified television program is broadcast.

7. A method as recited in claims 1 or 2, wherein one of said factors is comprised of monitoring closed captioning information of the video programming being displayed in order to identify subject matter of the video programming, so that an appropriate advertisement is to be selected for display based at least in part on the identified subject matter.

8. A method as recited in claims 1 or 2, wherein one of said factors is comprised of compiling demographic data characterizing a viewer of the displayed video programming feed, so that an appropriate advertisement is to be selected for display based at least in part on the compiled demographic data.

9. A method as recited in claims 1 or 2, wherein one of said factors is comprised of compiling geographical data specifying the geographical location of the home entertainment system, so that an appropriate advertisement is to be selected for display based at least in part on the geographical location.

10. A method as recited in claims 1 or 2, wherein one of said factors is comprised of compiling data characterizing the habits of a viewer of the video programming relative to the features of the home entertainment system, so that an appropriate advertisement is to be selected for display based at least in part on the habits of the viewer.

11. A method as recited in claim 10, wherein the habits of the viewer include at least one of the types of video programming watched by the viewer, the types of Internet sites visited by the viewer, and purchases made by the viewer through the Internet.

12. A method as recited in claims 1 or 2, wherein one of said factors is comprised of presenting a survey including one or more inquiries to a viewer of the video programming, so that an appropriate advertisement is to be selected for display based at least in part on responses of the viewer to the survey.

13. A method as recited in claims 1 or 2, wherein one of said factors is comprised of detecting a content rating associated with the video programming, so that an appropriate advertisement is to be selected for display based at least in part on the content rating.

14. A method as recited in claims 1 or 2, wherein one of said factors is comprised of identifying a parental lock code entered to the home entertainment system, so that an appropriate advertisement is to be selected for display based at least in part on the parental lock code.

15. A method as recited in claims 1 or 2, wherein the step of displaying the video programming comprises the step of transmitting the video programming from a video recording media located at the home entertainment system, and wherein one of said factors is comprised of the recorded nature of the video programming.

16. A method as recited in claims 1 or 2, wherein one of said factors is comprised of compiling information relating to the actions that a viewer of the video programming feed has taken in response to previous displayed advertisements, so that an appropriate advertisement is to be selected for display based at least in part on the compiled information.

17. A method as recited in claims 1 or 2, further comprising the step of storing information contained in the displayed advertising content for later reference in response to actions of a viewer of the displayed advertising content.

18. A method as recited in claims 1 or 2, wherein said selected advertising content is comprised of a first and a second advertisement which are simultaneously displayed in a split-screen format on the display device.

19. A method as recited in claims 1 or 2, further comprising, either during or after display of said selected advertising content, a step for collecting information about actions of a viewer of said selected advertisement, including at least one of either channel changes during display of said selected advertisement, requests by said viewer for additional information, or feedback provided by said viewer in response to said selected advertisement.

20. A method as recited in claims 1 or 2, further comprising a step for learning the identity of the viewer by requesting that a viewer log on to the home entertainment system before displaying the video programming, and wherein one of said factors is comprised of the identity of the viewer.

21. A method as recited in claims 1 or 2, wherein the selected advertising content comprises one or more computer-generated documents.

22. A method as recited in claims 1 or 2, further comprising a step for monitoring a cumulative number of times that one or more advertisements of the selected advertising content has been displayed at the home entertainment system, and wherein one of said factors is comprised of the cumulative number.

23. A method as recited in claims 1 or 2, wherein the video programming and the selected advertising content are multiplexed and delivered to the home entertainment system in a single data stream.

* * * * *